(12) United States Patent
Matsumoto

(10) Patent No.: US 6,371,270 B1
(45) Date of Patent: Apr. 16, 2002

(54) ELECTROMAGNETIC CLUTCH

(75) Inventor: Hideyuki Matsumoto, Isesaki (JP)

(73) Assignee: Sanden Corporation, Gunma (JP)

( * ) Notice: Subject to any disclaimer, the term of this patent is extended or adjusted under 35 U.S.C. 154(b) by 1 days.

(21) Appl. No.: 09/606,037

(22) Filed: Jun. 29, 2000

(30) Foreign Application Priority Data

Jul. 5, 1999 (JP) .......................................... 11-190329

(51) Int. Cl.$^7$ .......................... F16D 27/10; F16D 27/14
(52) U.S. Cl. ............................... 192/84.961; 192/84.9; 335/296
(58) Field of Search ..................... 192/84.961, 84.96, 192/84.9; 335/296; 336/96; 417/319

(56) References Cited

U.S. PATENT DOCUMENTS

| | | | | |
|---|---|---|---|---|
| 3,451,021 A | * | 6/1969 | Atherton ................... 336/96 X |
| 4,935,713 A | * | 6/1990 | Bekheet ....................... 335/296 |
| 5,199,541 A | * | 4/1993 | Tobyama et al. ... 192/84.961 X |
| 5,307,038 A | * | 4/1994 | Ishimaru ..................... 335/296 |
| 5,967,282 A | * | 10/1999 | Takahashi .............. 192/84.961 |

FOREIGN PATENT DOCUMENTS

JP    57-192629 A   * 11/1982

* cited by examiner

*Primary Examiner*—Rodney H. Bonck
(74) *Attorney, Agent, or Firm*—Baker Botts L.L.P.

(57) ABSTRACT

An electromagnetic clutch includes an electromagnet device housed in a rotor. The electromagnet device has a ring member having a containing chamber, a coil member having a bobbin and a coil element and housed in the containing chamber of the ring member, and a seal mechanism provided for enclosing the coil element in the containing chamber at a sealed-off condition. A desired seal mechanism is formed without using a molding resin. The productivity of manufacturing processes for the electromagnetic clutch may be increased by stopping use of a molding resin. Moreover, the proper insulation of the electromagnet device may be ensured by the desired seal mechanism.

12 Claims, 18 Drawing Sheets

ELECTROMAGNETIC CLUTCH

BACKGROUND OF THE INVENTION

1. Field of the Invention

The present invention relates to an electromagnetic clutch, and more specifically, to an electromagnetic clutch suitable for use in compressors.

2. Description of Related Art

An electromagnetic clutch is used as a power transmission for a compressor. For example, a known structure of a scroll-type compressor having an electromagnetic clutch is constructed as depicted in FIG. 17. In FIG. 17, electromagnetic clutch 100 is assembled around cylindrical projected portion 121a of front housing 121 of scroll-type compressor 120. Electromagnetic clutch 100 includes rotor 101, which is mounted upon projected portion 121a via bearing 123. Rotor 101 has inner cylindrical portion 101a, outer cylindrical portion 101b, and bottom portion 101c connecting the ends of cylindrical portions 101a and 101b. Containing space 101d is formed by portions 101a, 101b and 101c. Electromagnet device 102 is enclosed within containing space 101d of rotor 101.

Armature 103 is provided facing one end of rotor 101. Armature 103 is connected to stopper plate 105 via plate spring 104. Stopper plate 105 is fixed to boss portion 106 via rivets 107. Boss portion 106 is fixed to end portion 122a of drive shaft 122 by threaded nut 108.

In electromagnetic clutch 100, a rotational torque is transmitted from an external power source (not shown) to rotor 101 via a V belt (not shown). When electromagnet device 102 is not energized, because armature 103 is urged by plate spring 104 away from rotor 101, even if rotor 101 rotates, armature 103 does not rotate. Therefore, the rotational torque of rotor 101 is not transmitted to drive shaft 122. When electromagnet device 102 is energized, armature 103 is attracted to the end of rotor 101 by the attracting force generated by electromagnet device 102, in opposition to the urging force applied by plate spring 104. Therefore, rotor 101 and armature 103 are integrated, and rotated together. The rotational torque of rotor 101 is transmitted to drive shaft 122 through stopper plate 105 and boss portion 106, thereby driving compressor 120.

FIG. 18 depicts an inclined plate-type compressor as another type of compressor. In FIG. 18, electromagnetic clutch 110 is assembled around of cylindrical projected portion 131a of front housing 131 of inclined plate-type compressor 130. Electromagnetic clutch 110 may have a structure similar to that depicted in FIG. 17.

FIG. 19 depicts an example of the detailed structure of the electromagnet device depicted in FIG. 17 or 18. In FIG. 19, electromagnet device 102 has ring member 113 forming therein a containing chamber 113a. Ring-like plate 114 is provided on one end outer surface of ring member 113 for fixing ring member 113 on a front housing of a compressor. Coil bobbin 112 provided with coil element 111 is housed within containing chamber 113a of ring member 113. Coil bobbin 112 is enclosed within containing chamber 113a by charging resin 115, such as an epoxy resin into containing chamber 113a. Thus, in a known technology, a method for molding a resin is employed for preventing water or foreign material from entering into an electromagnetic clutch, including for ensuring the properties of vibration resistance, heat radiation resistance, and water proofing.

FIG. 20 depicts another example of the detailed structure of the electromagnet device depicted in FIG. 17 or 18. In FIG. 20, electromagnet device 102' has bobbin 116 formed as two separate parts. After coil element 111 is enclosed within the two parts of bobbin 116, bobbin 116 is housed within containing chamber 113a of ring member 113. Enclosed bobbin 116 then is fixed by caulked portions 117 formed at the partial inner edges of the opening portion of containing chamber 113a.

In the known structure depicted in FIG. 19, however, because resin 115 for molding generally is a thermosetting resin, such as an epoxy resin, manufacturing electromagnet device 102 requires an expensive furnace for curing of the resin. Further, it takes a long period of time to cure the resin, thereby decreasing the productivity of manufacturing processes for such an electromagnetic clutch.

In the known structure depicted in FIG. 20, it is difficult to completely prevent water from entering into coil element 111 through a gap between the two parts of bobbin 116. Therefore, there is a problem insulating coil element 111.

SUMMARY OF THE INVENTION

Accordingly, it is an object of the present invention to provide an improved structure for an electromagnetic clutch that may increase the productivity of manufacturing processes by stopping use of a molding resin, and that may ensure the proper insulation of an electromagnet device.

To achieve the foregoing and other objects, an electromagnetic clutch according to the present invention is provided. The electromagnetic clutch includes an electromagnet device housed within a rotor. The electromagnet device comprises a ring member having a containing chamber, a coil member housed within the containing chamber of the ring member. The coil member comprises a bobbin and a coil element provided within the bobbin. The electromagnet device comprises a seal mechanism provided for enclosing the coil element within the containing chamber of the ring member in a sealed-off condition.

In the electromagnetic clutch, the seal mechanism comprises a seal plate to improve the seal formed between the bobbin and the ring member. The seal plate engages an engaging portion formed on an inner surface of the containing chamber of the ring member. The seal plate may comprise a side plate portion integral with the bobbin. Alternatively, the seal plate may comprise a resin plate provided separately from the bobbin.

The engaging portion may comprise a first groove formed on the inner surface of the containing chamber of the ring member. The first groove extends circumferentially about the ring member. Further, the engaging portion may comprise a stepped portion formed on the inner surface of the containing chamber of the ring member. The stepped portion extends circumferentially about the ring member.

The seal plate may have a projection extending circumferentially about the ring member. The projection engages the engaging portion formed on the inner surface of the containing chamber of the ring member. The projection may be brought into contact with the engaging portion. Further, the projection may be fitted into a second groove formed on the engaging portion. The second groove extends circumferentially about the ring member.

Further, the seal plate may have a V-shaped groove on its radial end surface, i.e., a radially outer end surface, or a radially inner end surface, or both. The seal plate may have a notch on its edge portion. The notch extends circumferentially about the seal plate.

The seal plate is fixed in the containing chamber of the ring member. For example, a part of the inner surface of the containing chamber of the ring member is crimped, and the seal plate is fixed in the containing chamber of the ring member by the crimping. Crimping may include the formation of a wave, bulge, crinkle, warp, or similar deformation in the ring member surface. A plurality of crimped portions may be disposed circumferentially about the ring member, or a crimped portion may extend continuously over the entire circumference of the ring member. The crimped portion, or portions, may be disposed on the inner surface of an outer cylindrical portion of the ring member, or an outer surface of an inner cylindrical portion of the ring member, or both.

An inner surface of of the containing chamber of the ring member positioned below the engaging portion, may be formed as a tapered surface causing a width of the containing chamber to gradually decrease.

The seal mechanism may comprise a protruded portion placed into contact with an inner surface of the containing chamber of the ring member. The protruded portion extends circumferentially about the ring member. The cross-sectional shape may be rectangular, semi-circular, triangular, or trapezoidal.

Such an electromagnetic clutch is used, for example, for a compressor. Any type of the compressor may be available.

In the electromagnetic clutch according to the present invention, the seal mechanism does not require a molding resin to achieve a desired quality of seal. The number of manufacturing steps may be decreased by stopping use of the molding resin, thereby reducing the cost for the manufacture of the electromagnetic clutch.

Further, because the seal mechanism may achieve a high quality of seal for the coil element without using a molding resin, the proper insulation of the coil element may be ensured readily and less expensively.

Further objects, features, and advantages of the present invention will be understood from the following detailed description of preferred embodiments of the present invention with reference to the accompanying figures.

BRIEF DESCRIPTION OF THE DRAWINGS

Embodiments of the invention are now described with reference to the accompanying figures, which are given by way of example only, and are not intended to limit the present invention.

DETAILED DESCRIPTION OF PREFERRED EMBODIMENTS

Figure 1:
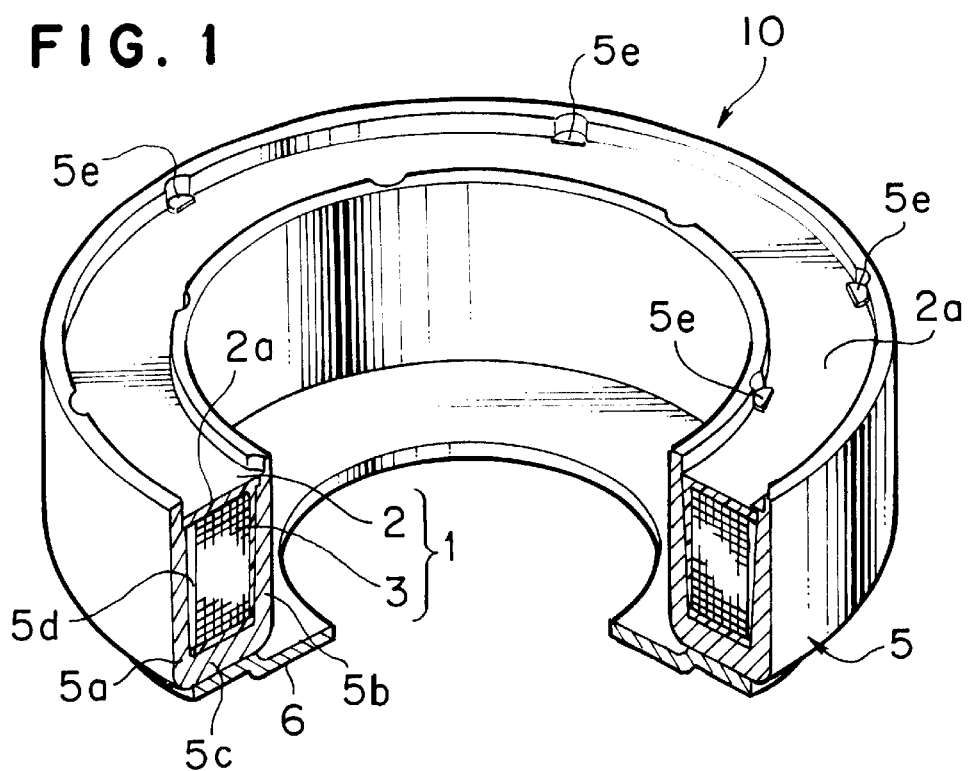
FIG. 1 is a perspective, cut-away view of an electromagnet device of an electromagnetic clutch according to a first embodiment of the present invention.
Figure 2:
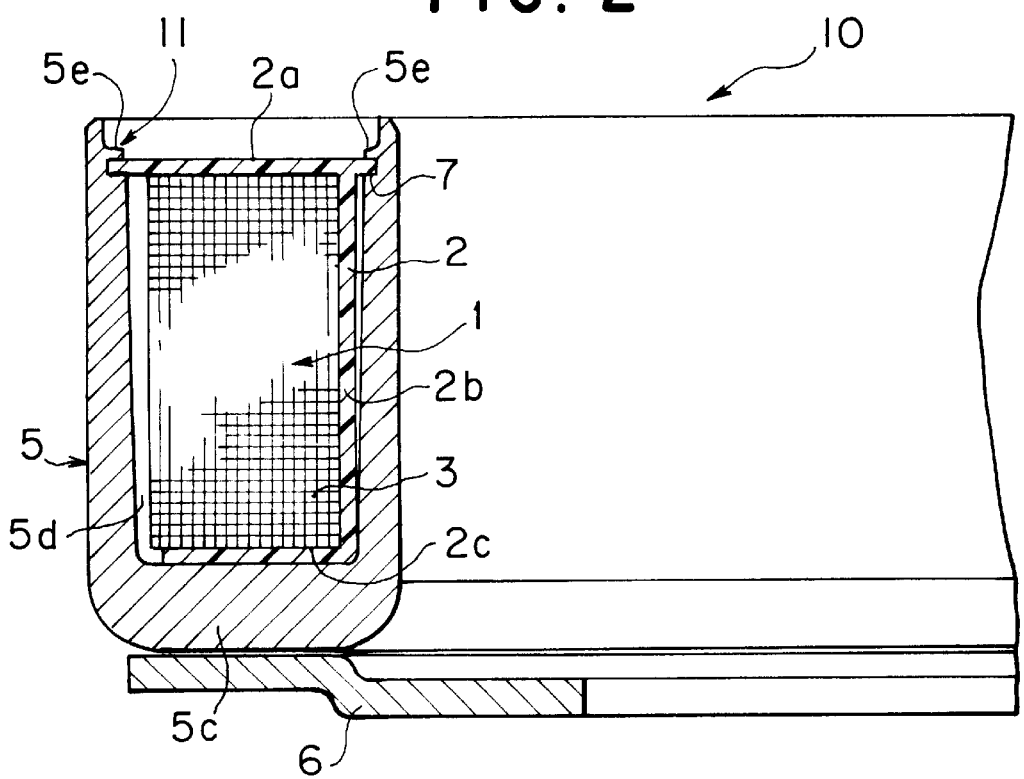
FIG. 2 is an enlarged, partial cross-sectional view of the electromagnet device depicted in FIG. 1.
Figure 17:
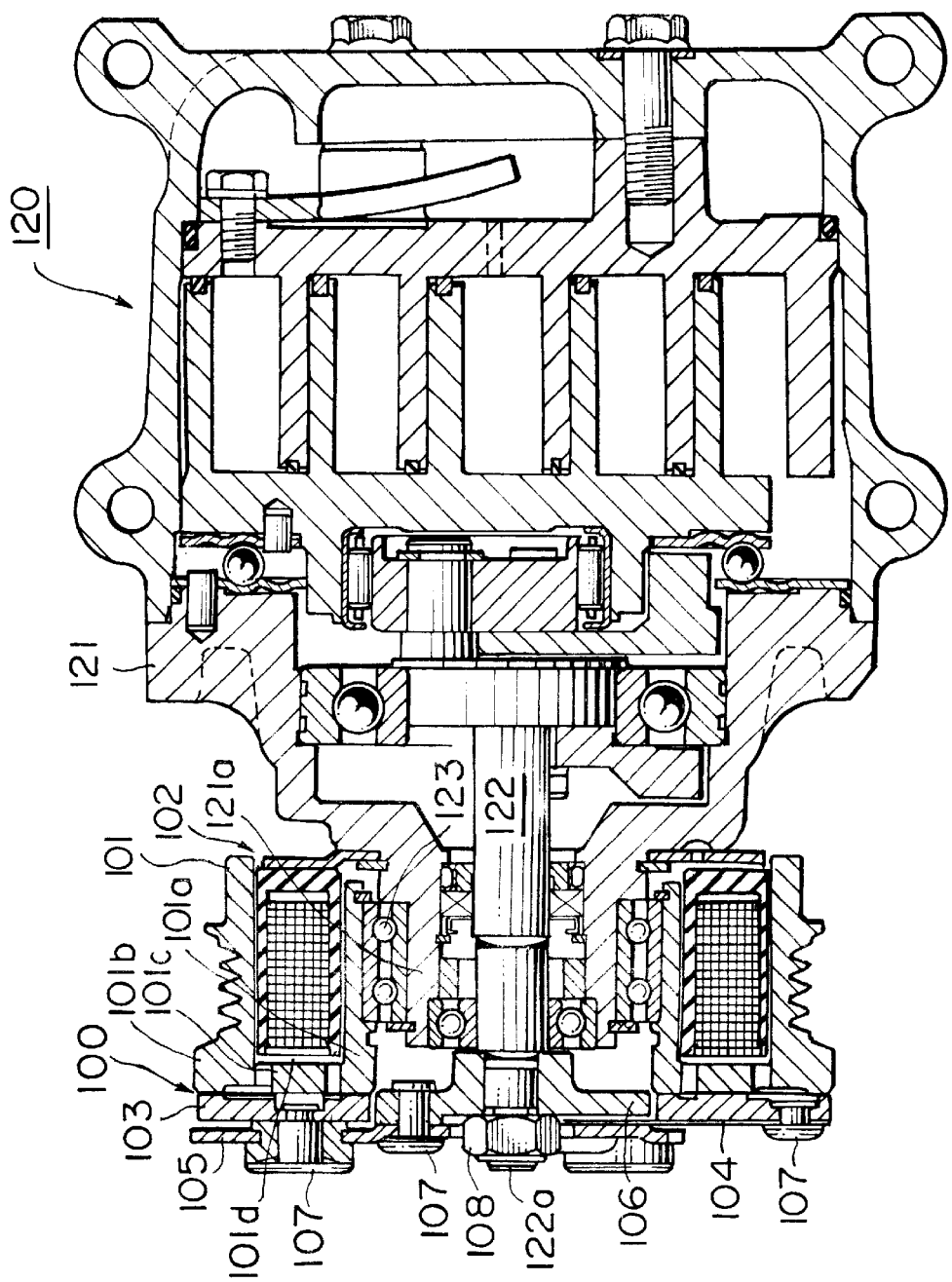
FIG. 17 is a cross-sectional view of a known scroll-type compressor including an electromagnetic clutch.
Figure 18:
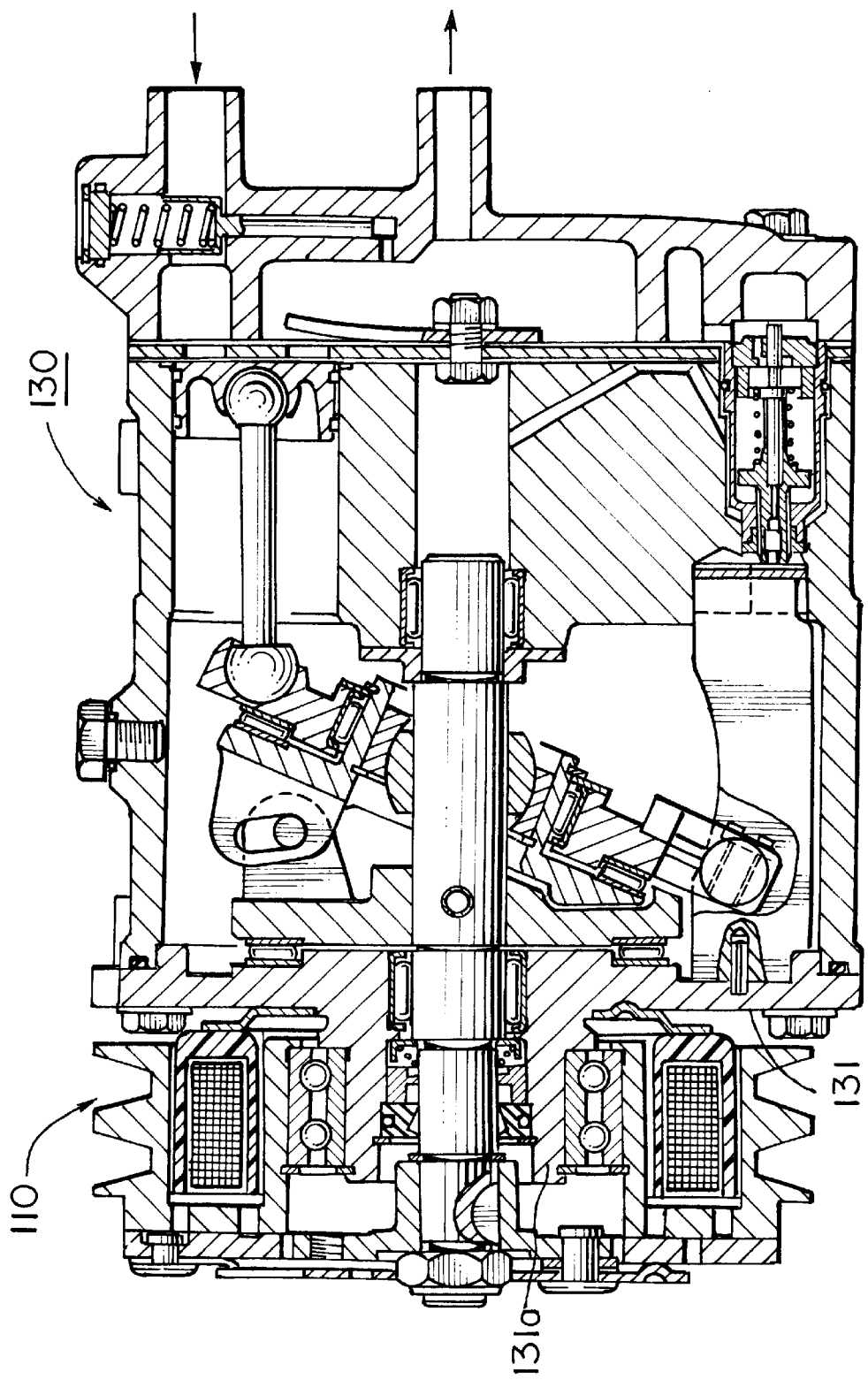
FIG. 18 is a cross-sectional view of a known inclined plate-type compressor including an electromagnetic clutch.
Figure 19:
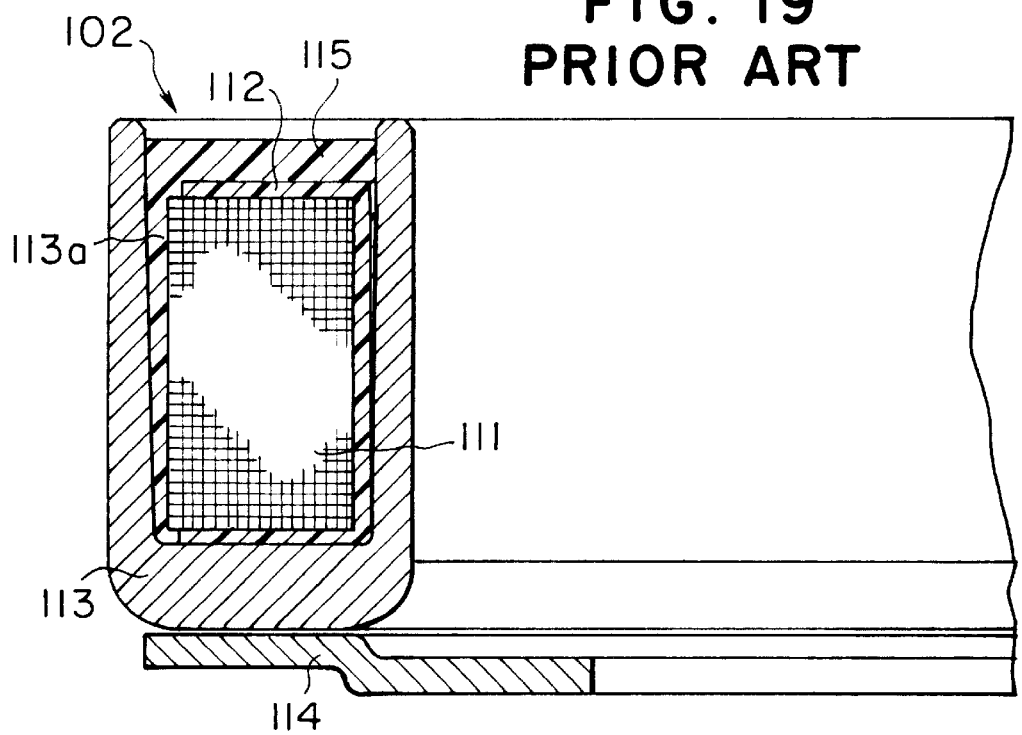
FIG. 19 is a partial, cross-sectional view of an example of an electromagnet device used in the electromagnetic clutch depicted in FIG. 17 or 18.
Figure 20:
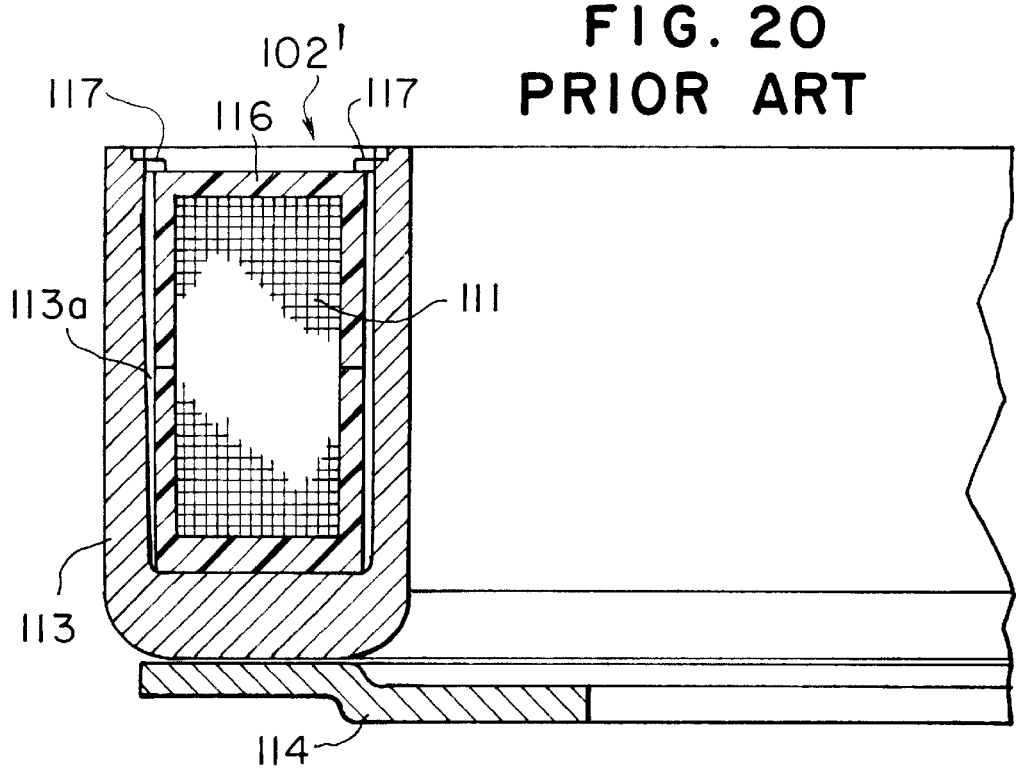
FIG. 20 is a partial, cross-sectional view of another example of an electromagnet device used in the electromagnetic clutch depicted in FIG. 17 or 18.

An electromagnetic clutch according to a first embodiment of the present invention is depicted in FIGS. 1 and 2. Referring to FIGS. 1 and 2, electromagnet device 10 provided in an electromagnetic clutch comprises ring member 5, coil member 1, and fastening member 6. Ring member 5 has outer cylindrical portion 5a, inner cylindrical portion 5b, and bottom portion 5c connecting the ends of outer and inner cylindrical portions 5a and 5b. Containing chamber 5d is formed as a ring-like groove portion in ring member 5 by respective portions 5a–5c. Coil member 1 is contained in containing chamber 5d. Fastening member 6 is fixed to a front housing of a compressor, as depicted in FIG. 17 or 18.

Coil member 1 comprises ring-like bobbin 2, made from a resin, and coil element 3 provided in bobbin 2. Bobbin 2 has a U-shaped cross section formed by side plate portion 2a (a ceiling plate portion), the other side plate portion 2c (a bottom plate portion), and connecting plate portion 2b. Coil element 3 is contained within the U-shaped bobbin 2.

Engaging portion 7 is formed on the upper end portion of each of the radial inner surface of outer cylindrical portion 5a and the radial outer surface of inner cylindrical portion 5b, at the opening portion of U-shaped ring member 5. In this embodiment, engaging portion 7 is formed as a stepped portion extending circumferentially about ring member 5. The radial outer and inner edges of side plate portion 2a of bobbin 2 engage engaging portion 7. A part of the upper end of each of the radial inner surface of outer cylindrical portion 5a and the radial outer surface of inner cylindrical portion 5b above engaging portion 7 is crimped on each of the radial outer and inner edges of side plate portion 2a of bobbin 2. A plurality of crimped portions 5e are disposed circumferentially about ring member 5 on the respective surfaces of outer and inner cylindrical portions 5a and 5b.

By this crimping, coil member 1 may be securely fixed in ring member 5 at a condition in that bottom plate portion 2c of bobbin 2 is brought into contact with the upper surface of bottom portion 5c of ring member 5. Referring to FIG. 2, the width of side plate portion 2a of bobbin 2 is slightly larger than the distance between the radial inner surface of outer cylindrical portion 5a and the radial outer surface of inner cylindrical portion 5b, measured above engaging portion 7. Therefore, side plate portion 2a of bobbin 2 is press fitted into the portion between outer and inner cylindrical portions 5a and 5b, and both radial end surfaces of side plate portion 2a are press contacted to the radial inner surface of outer cylindrical portion 5a and the radial outer surface of inner cylindrical portion 5b. From this configuration, coil member 1 is fixed in ring member 5 by the crimping. Thus, seal mechanism 11 is formed by side plate portion 2a of bobbin 2 engages portions 7 and includes crimped portions 5e. Because seal mechanism 11 seals coil member 1 with press fitted side plate portion 2a of bobbin 2, coil element 3 may be enclosed in containing chamber 5d of ring member 5 and substantially completely sealed-off from the outside.

In the embodiment of FIG. 2, it is not necessary to use a molding resin for sealing coil element 3, which has required an extended period of time for curing and several steps. Therefore, the time and the number of steps for manufacturing the electromagnetic clutch may be decreased, and the cost for the manufacture may be reduced. Further, the desired insulation for coil element 3 may be achieved readily and less expensively without using a molding resin.

Figure 3A:
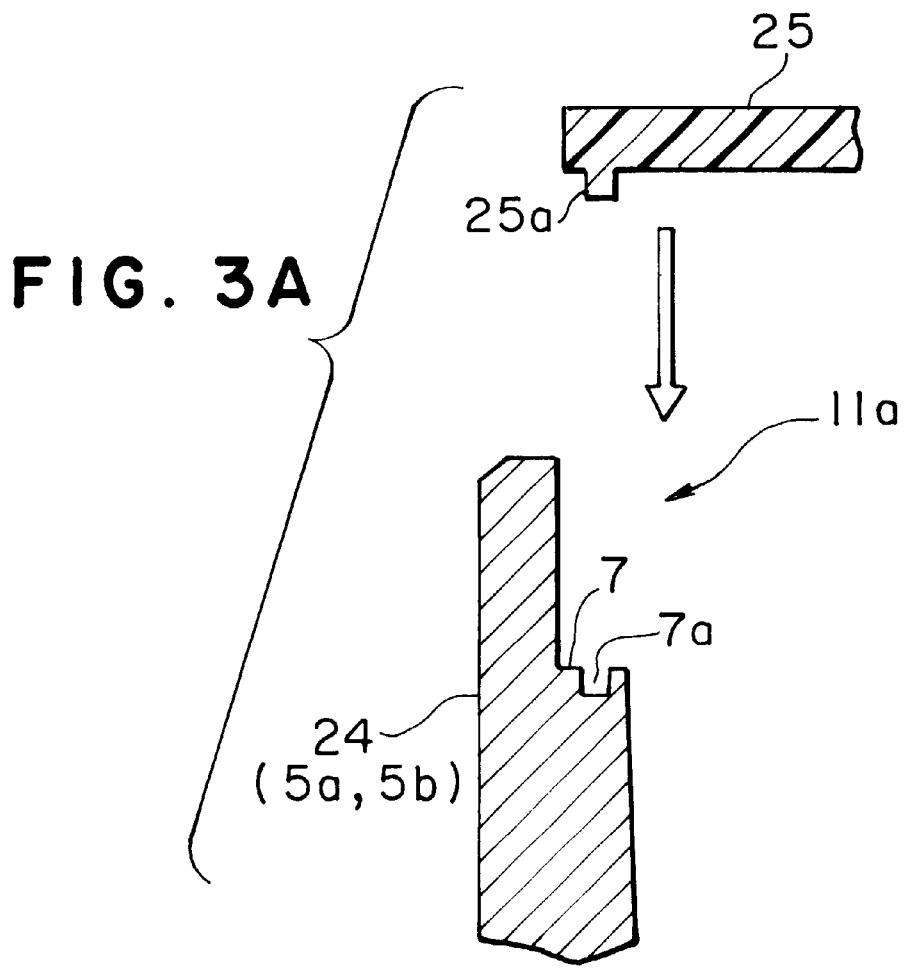
FIG. 3A is an exploded and enlarged, partial cross-sectional view.
Figure 3B:
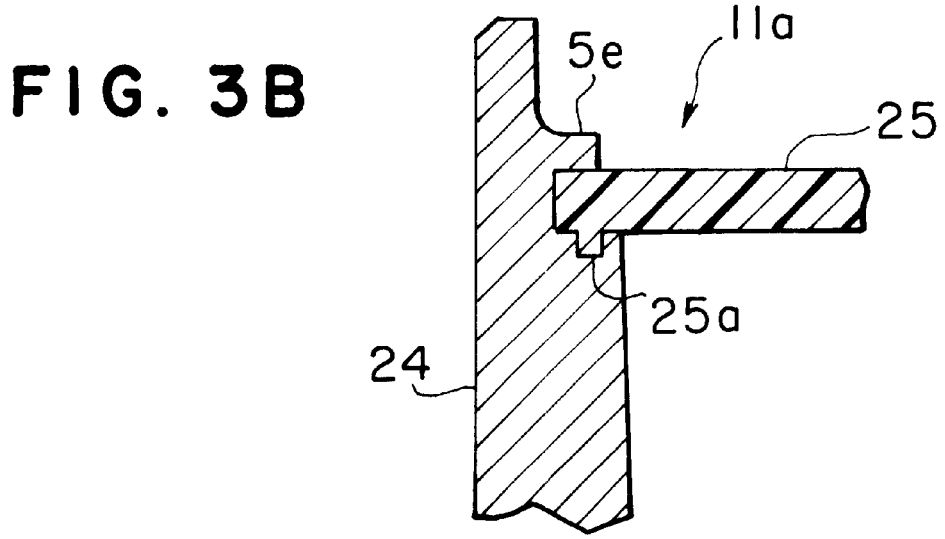
FIG. 3B is an enlarged, partial cross-sectional view of a seal mechanism in the electromagnet device depicted in FIG. 2 according to a modification of the first embodiment.

FIGS. 3A and 3B depict seal mechanism 11a according to a modification of the above-described first embodiment of the present invention. As depicted in FIG. 3A, in seal mechanism 11a, a groove 7a extending over the entire circumference of ring member 5 is formed on the upper surface of engaging portion 7 formed on radial outer cylindrical portion 5a, or radial inner cylindrical portion 5b, or both (hereinafter, these portions are referred to as a "cylindrical portion 24"). Side plate portion 2a of bobbin 2 (hereinafter, referred to as a "seal plate 25") has projection 25a extending over the entire circumference of seal plate 25, at a position corresponding to the position of groove 7a. Seal plate 25 has a width larger than the distance between the surfaces of cylindrical portions 24, measured above engaging portion 7. Seal plate 25 is inserted and press fitted into the opening portion of ring member 5, as shown by the arrow in FIG. 3A.

As depicted in FIG. 3B, after seal plate 25 is press fitted and projection 25a is inserted into groove 7a formed on engaging portion 7, an inner upper edge portion of cylindrical portion 24 is crimped to form crimped portion 5e. Thus, seal plate 25 is fixed in ring member 5, and coil element 3 is enclosed in containing chamber 5d of ring member 5 in a completely sealed-off condition.

Figure 4A:
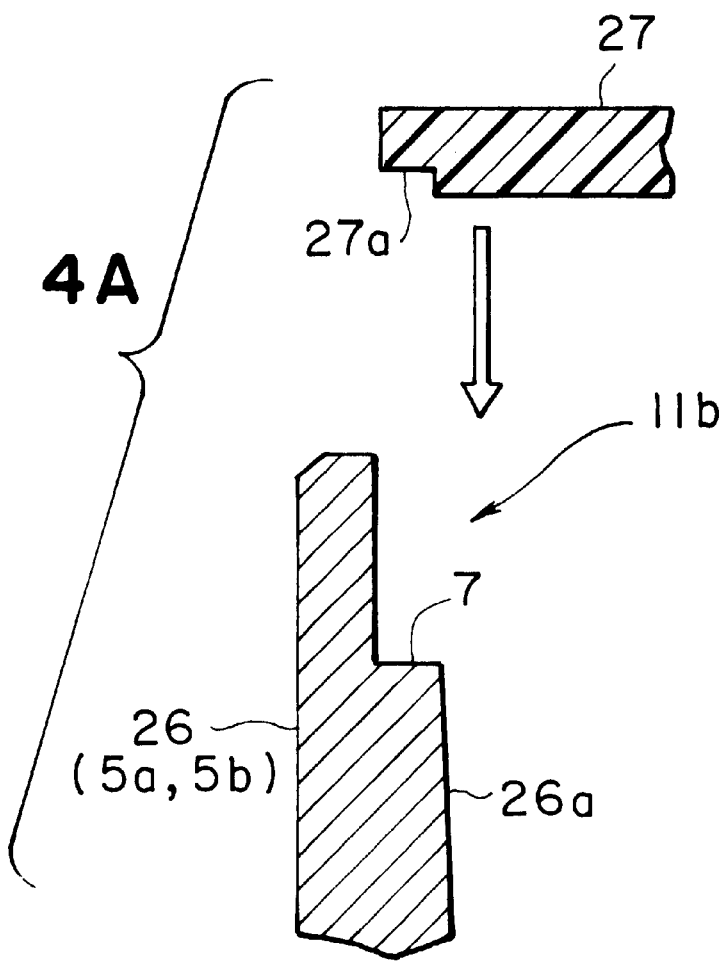
FIG. 4A is an exploded and enlarged, partial cross-sectional view.
Figure 4B:
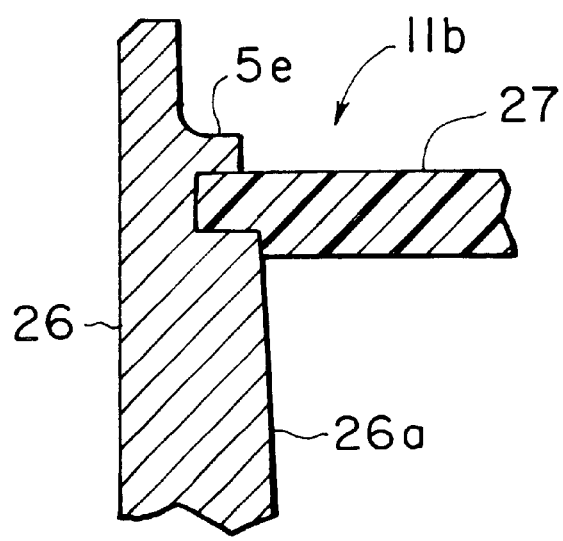
FIG. 4B is an enlarged, partial cross-sectional view of a seal mechanism in the electromagnet device depicted in FIG. 2 according to another modification of the first embodiment.

FIGS. 4A and 4B depict seal mechanism 11b according to another modification of the first embodiment of the present invention described above. As depicted in FIG. 4A, in seal mechanism 11b, engaging portion 7 formed as a stepped portion extends over the entire circumference of ring member 5 on radial outer cylindrical portion 5a, or radial inner cylindrical portion 5b, or both (hereinafter, these portions are referred to as a "cylindrical portion 26"). Side plate portion 2a of bobbin 2 (hereinafter, referred to as a "seal plate 27") has notch 27a extending over the entire circumference of seal plate 27, at a position corresponding to the shoulder position of engaging portion 7. The portion positioned below engaging portion 7 on the inner surface of cylindrical portion 26 is formed as a tapered surface 26a causing the width of containing portion 5d to gradually decrease. The edge portion of seal plate 27 having notch 27a engages engaging portion 7 including the upper portion of tapered inner surface 26a of cylindrical portion 26 by inserting and press fitting seal plate 27 into the opening portion of ring member 5, as shown by the arrow in FIG. 4A.

As depicted in FIG. 4B, after seal plate 27 is press fitted and notch 27a engages engaging portion 7 including the upper portion of tapered inner surface 26a, an inner upper edge portion of cylindrical portion 26 is crimped to form crimped portion 5e. Thus, seal plate 27 is fixed in ring member 5, and coil element 3 is enclosed in containing chamber 5d of ring member 5 in a completely sealed-off condition.

Figure 5A:
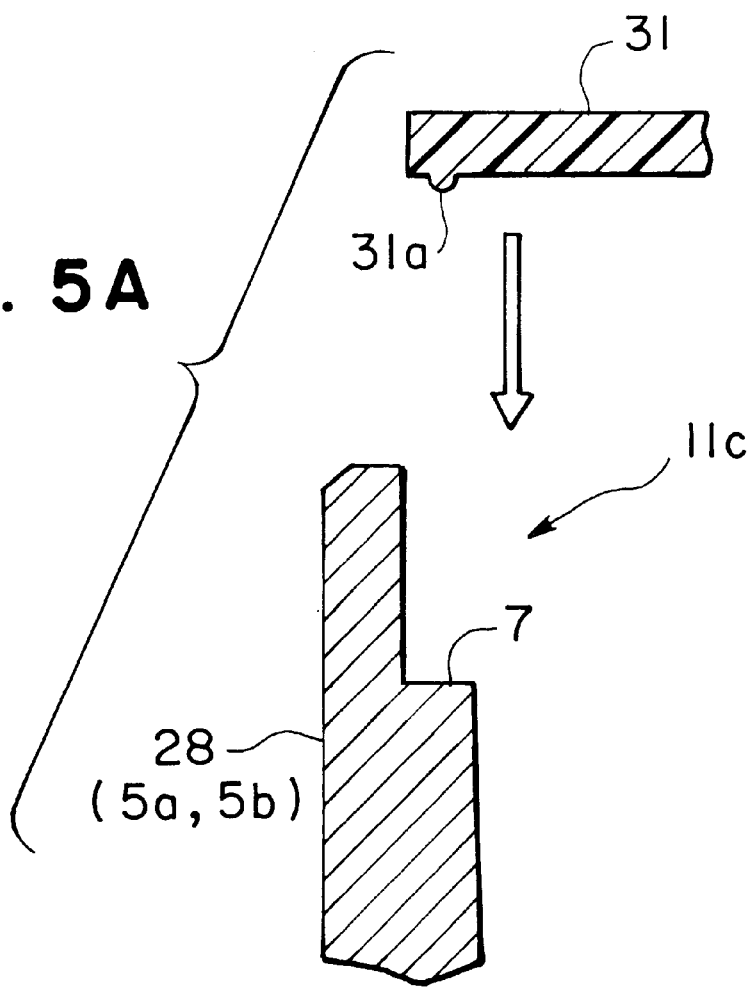
FIG. 5A is an exploded and enlarged, partial cross-sectional view.
Figure 5B:
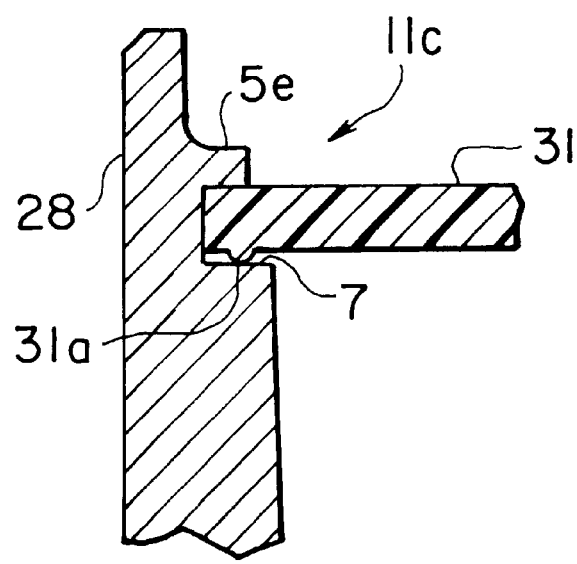
FIG. 5B is an enlarged, partial cross-sectional view of a seal mechanism in the electromagnet device depicted in FIG. 2 according to a further modification of the first embodiment.

FIGS. 5A and 5B depict seal mechanism 11c according to a further modification of the first embodiment of the present invention described above. As depicted in FIG. 5A, in seal mechanism 11c, engaging portion 7 formed as a stepped portion extends over the entire circumference of ring member 5 on radial outer cylindrical portion 5a, or radial inner cylindrical portion 5b, or both (hereinafter, these portions are referred to as a "cylindrical portion 28"). Side plate portion 2a of bobbin 2 (hereinafter, referred to as a "seal plate 31") has projection 31a extending over the entire circumference of seal plate 31 on its lower surface, at a position corresponding to the upper surface of engaging portion 7. The edge portion of seal plate 31 engages engaging portion 7 as well as projection 31a and is placed into contact with the upper surface of engaging portion 7, by inserting and press fitting seal plate 31 into the opening portion of ring member 5, as shown by the arrow in FIG. 5A.

As depicted in FIG. 5B, after seal plate 31 is press fitted and projection 31a is placed into contact with the upper surface of engaging portion 7, an inner upper edge portion of cylindrical portion 28 is crimped to form crimped portion 5e. Thus, seal plate 31 is fixed in ring member 5, and coil element 3 is enclosed in containing chamber 5d of ring member 5 in a completely sealed-off condition.

Figure 6:
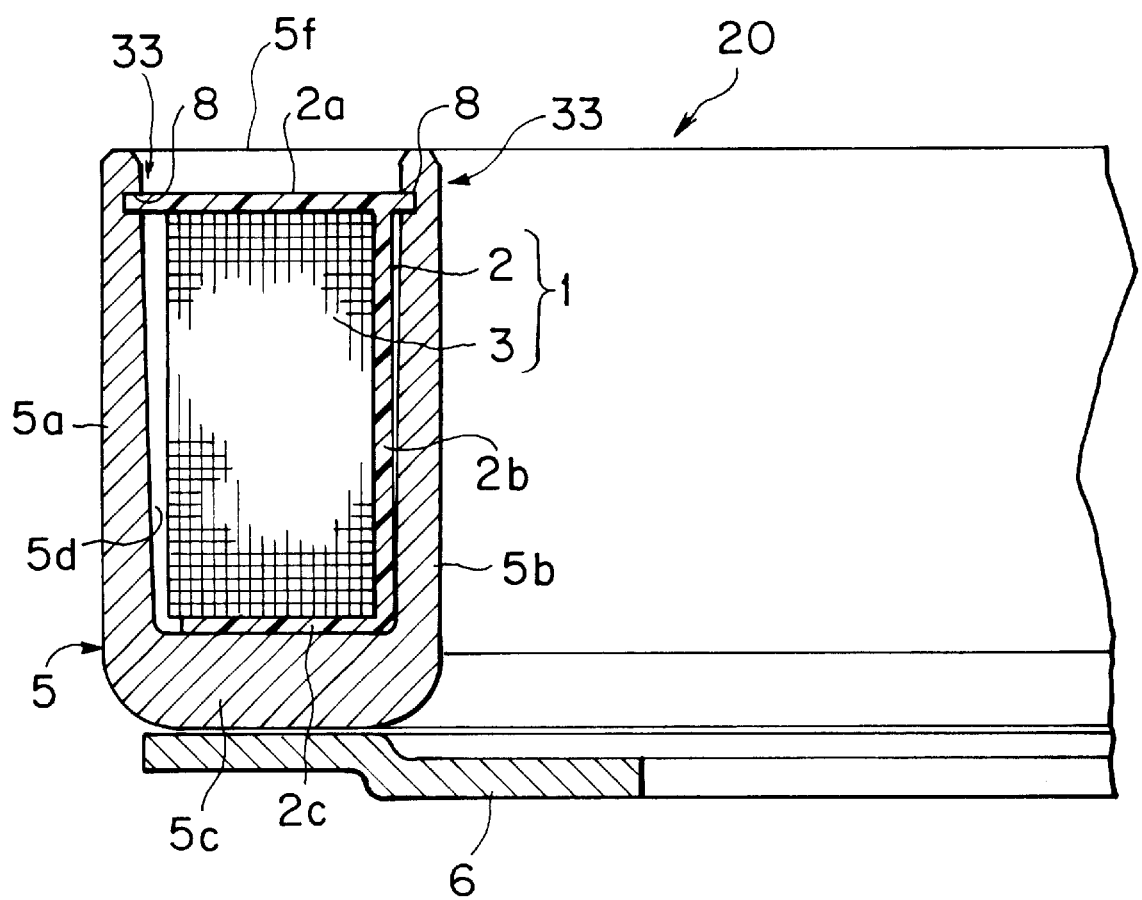
FIG. 6 is a partial, cross-sectional view of an electromagnet device of an electromagnetic clutch according to a second embodiment of the present invention.

FIG. 6 depicts an electromagnet device of an electromagnetic clutch according to a second embodiment of the present invention. In FIG. 6, electromagnet device 20 provided in an electromagnetic clutch comprises coil member 1, ring member 5, and fastening member 6. Coil member 1 comprises ring-like bobbin 2, and coil element 3 provided in bobbin 2. Bobbin 2 has a U-shaped cross-section formed by side plate portion 2a (a ceiling plate portion), the other side plate portion 2c (a bottom plate portion), and connecting plate portion 2b. Coil element 3 is contained within the U-shaped bobbin 2. Side plate portion 2a has a width larger than the width of coil element 3.

Ring member 5 has outer cylindrical portion 5a, inner cylindrical portion 5b, and bottom portion 5c connecting the ends of outer and inner cylindrical portions 5a and 5b. Containing chamber 5d is formed as a ring-like groove portion in ring member 5 by respective portions 5a–5c. Grooves 8 provided as engaging portions are formed on the radial inner surface of outer cylindrical portion 5a and the radial outer surface of inner cylindrical portion 5b, at positions close to opening portion 5f of U-shaped containing chamber 5d of ring member 5. The radial outer and inner edges of side plate portion 2a of bobbin 2 are completely fitted into grooves 8 to form seal mechanism 33.

When the edges of side plate portion 2a of bobbin 2 are inserted into grooves 8, the width of opening portion 5f may be expanded by elastically deforming cylindrical portions 5a and 5b by pressing side plate portion 2a into containing portion 5d through opening portion 5f. Alternatively, the width of side plate portion 2a may be decreased by elastically deforming side plate portion 2a by applying a pressing force from both ends of side plate portion 2a, so that the deformation of side plate portion 2a may be recovered by its elasticity after the edges of side plate portion 2a are inserted into grooves 8. Further, the width of opening portion 5f may be expanded by using an appropriate jig (not shown).

Thus, seal mechanism 33 seals coil member 1 by engaging side plate portion 2a with grooves 8. Coil element 3 may be enclosed in containing chamber 5d of ring member 5 and substantially completely sealed-off from the outside. In this embodiment, it is not necessary to use a molding resin for sealing coil element 3, which has required an extended period of time for curing and several steps. Therefore, the time and the number of steps for manufacturing the electromagnetic clutch may be decreased, and the cost for the manufacture of the clutch may be reduced. Further, the desired insulation for coil element 3 may be achieved readily and less expensively without using a molding resin.

Figure 7A:
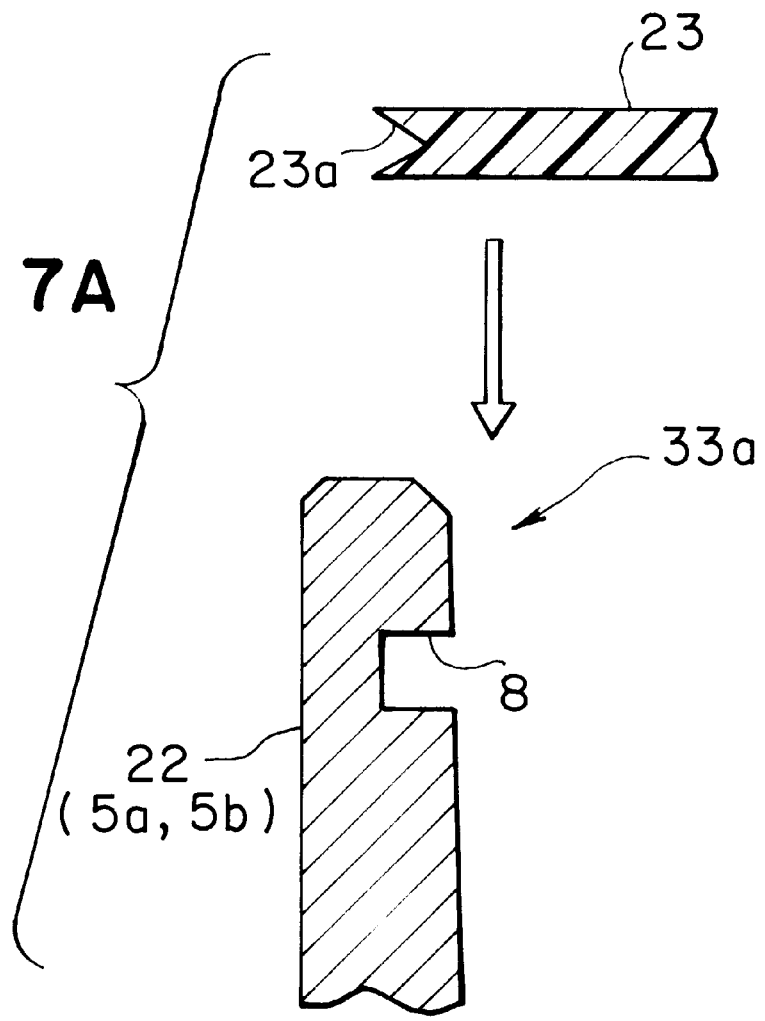
FIG. 7A is an exploded and enlarged, partial cross-sectional view.
Figure 7B:
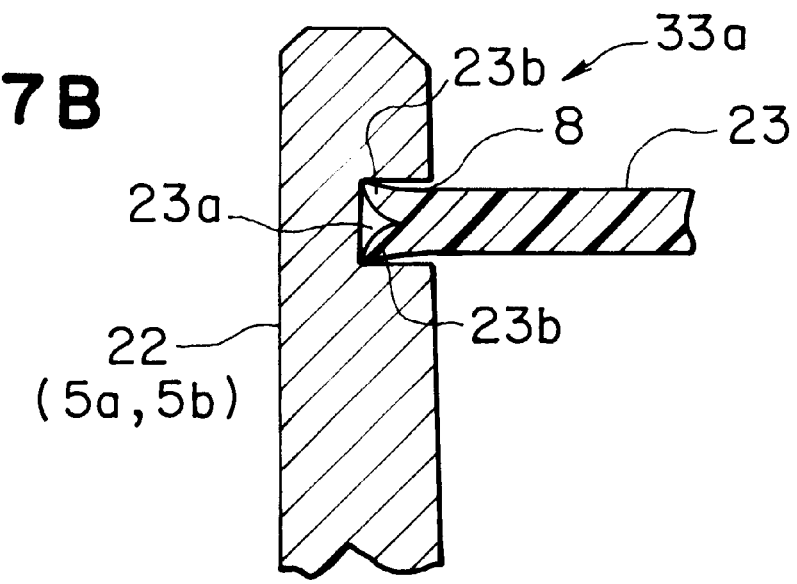
FIG. 7B is an enlarged, partial cross-sectional view of a seal mechanism in the electromagnet device depicted in FIG. 6 according to a modification of the second embodiment.

FIGS. 7A and 7B depict seal mechanism 33a according to a modification of the above-described second embodiment of the present invention. As depicted in FIG. 7A, in seal mechanism 33a, a groove 8 extends over the entire circumference of ring member 5 and is formed as an engaging portion on the surfaces of radial outer cylindrical portion 5a, or radial inner cylindrical portion 5b, or both (hereinafter, these portions are referred to as a "cylindrical portion 22"). Side plate portion 2a of bobbin 2 (hereinafter, referred to as a "seal plate 23") has V-shaped groove 23a on its radial end surface. V-shaped groove 23a extends over the entire circumference of seal plate 23. Seal plate 23 has a width larger than the distance between the opposing bottom surfaces of grooves 8. Seal plate 23 is inserted and press fitted into the opening portion of ring member 5, as shown by the arrow in FIG. 7A.

As depicted in FIG. 7B, when seal plate 23 is press fitted into groove 8, pressure is applied to the edge of seal plate 23 having V-shaped groove 23a. Consequently, the arms of V-shaped groove 23a are spread outwardly in groove 8 to form portions 23b deformed against the sides of groove 8. Deformed portions 23b are brought into complete contact with both side surfaces of groove 8. Thus, in seal mechanism 33a, seal plate 23 is fixed in ring member 5 in complete contact with groove 8, and coil element 3 is enclosed in containing chamber 5d of ring member 5 in a completely sealed-off condition.

Figure 8A:
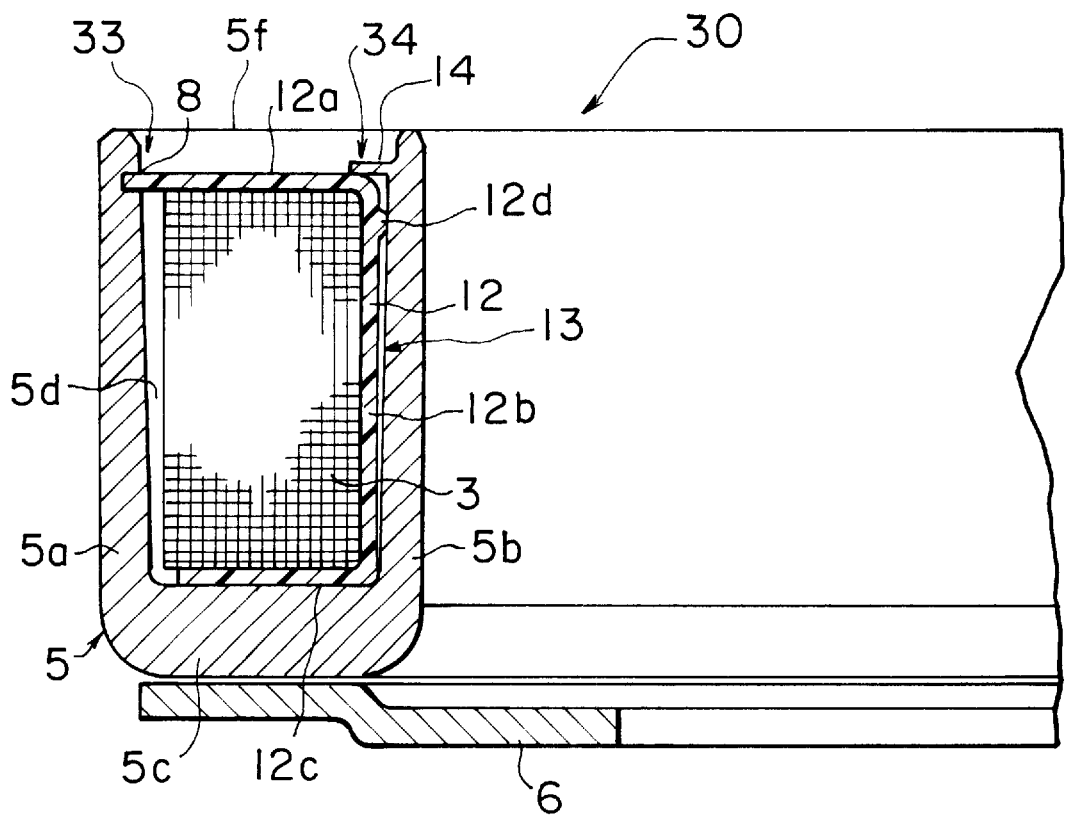
FIG. 8A is a partial, cross-sectional view of an electromagnet device of an electromagnetic clutch according to a third embodiment of the present invention.

FIG. 8A depicts an electromagnet device of an electromagnetic clutch according to a third embodiment of the present invention. In FIG. 8A, electromagnet device 30 provided in an electromagnetic clutch includes a ring member 5, coil member 13, and fastening member 6. Coil member 13 comprises bobbin 12 formed from a resin having an elasticity, and coil element 3 provided in bobbin 12. Bobbin 2 has a U-shaped cross-section formed by side plate portion 12a (a ceiling plate portion), the other side plate portion 12c (a bottom plate portion), and connecting plate portion 12b. Coil element 3 is contained within the U-shaped bobbin 12. Side plate portion 12a extends in the radial direction beyond the radial end of coil element 3. Connecting plate portion 12b has protruded portion 12d extending over the entire circumference of bobbin 12 at an upper position on the outer surface of connecting plate portion 12b (a radially inner surface of bobbin 12). When bobbin 12 of coil member 13 is inserted into containing chamber 5d of ring member 5, the radial outer edge of side plate portion 12a is fitted into groove 8 formed on the radial inner surface of outer cylindrical portion 5a of ring member 5 to form seal mechanism 33. The corner portion of bobbin 12 between side plate portion 12a and connecting plate portion 12b is fixed by crimped portion 14 formed by a part of the surface portion of the upper edge of inner cylindrical portion 5b of ring member 5 to form seal mechanism 34. Protruded portion 12d is press fitted onto the surface of inner cylindrical portion 5b at a position below seal mechanism 34 to further enhance the ability of this portion to seal containing chamber 5d. At the same time, side plate portion 12a is pressed in a radially outer direction by the reactive force due to the press fitting between protruded portion 12d and the surface of inner cylindrical portion 5b. Therefore, the radial outer edge of side plate portion 12a is fitted into groove 8 more securely. Further, even when there occurs a vibration in the electromagnetic clutch, for example, by a vibration of an engine of a vehicle, coil member 13 may be maintained within ring member 5 at a proper position more securely by providing protruded portion 12d.

Figure 8B:
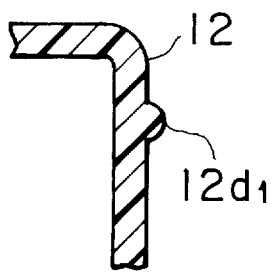
FIGS. 8B–8D are enlarged, partial cross-sectional views of various modifications of the seal mechanism of the electromagnet device depicted in FIG. 8A.
Figure 8C:
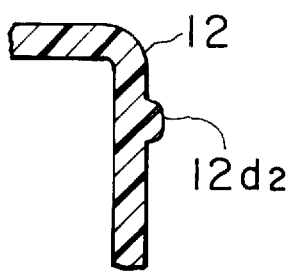
Figure 8D:
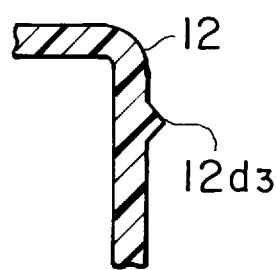

FIGS. 8B–8D depict various modifications with respect to the cross-sectional shape of protruded portion 12d. As depicted in FIG. 8B, the cross-sectional shape of protruded portion 12d, may be semi-circular. As depicted in FIG. 8C, the cross-sectional shape of protruded portion $12d_2$ may be rectangular or trapezoidal. As depicted in FIG. 8D, the cross-sectional shape of protruded portion $12d_3$ may be triangular.

Figure 9:
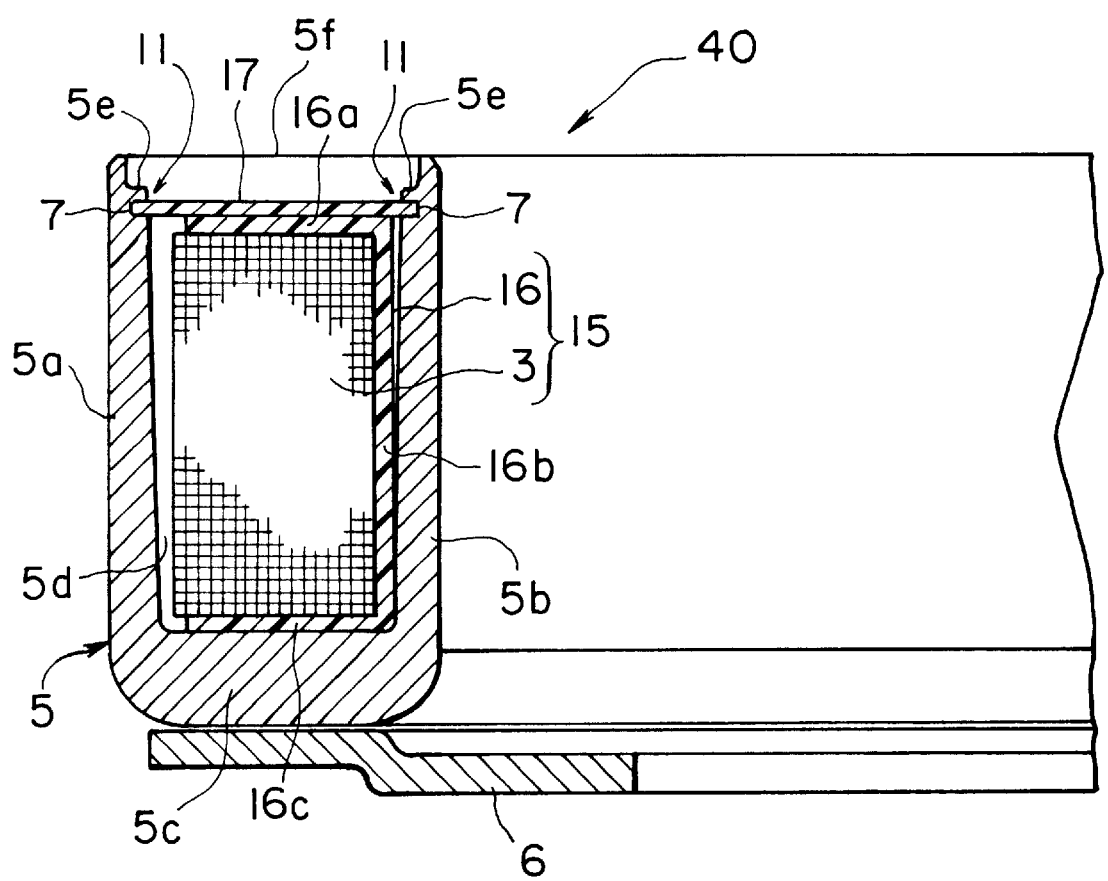
FIG. 9 is a partial, cross-sectional view of an electromagnet device of an electromagnetic clutch according to a fourth embodiment of the present invention.

FIG. 9 depicts an electromagnet device of an electromagnetic clutch according to a fourth embodiment of the present invention. In FIG. 9, electromagnet device 40 provided in an electromagnetic clutch includes a ring member 5; coil member 15; ring-like resin plate 17, which is provided as a seal plate separately from bobbin 16; and fastening member 6. Coil member 15 comprises bobbin 16 and coil element 3 provided in bobbin 16. Bobbin 16 has a U-shaped cross-section formed by side plate portion 16a (a ceiling plate portion), the other side plate portion 16c (a bottom plate portion), and connecting plate portion 16b. Coil element 3 is contained within the U-shaped bobbin 16. Resin plate 17 is provided on side plate portion 16a of bobbin 16. Resin plate 17 has a width greater than the width of containing chamber 5d of ring member 5. The radial edge portions of resin plate 17 are engaged to engaging portions 7, and fixed by crimped portions 5e. Side plate portion 16a has a width less than the width of containing chamber 5d.

Figure 10:
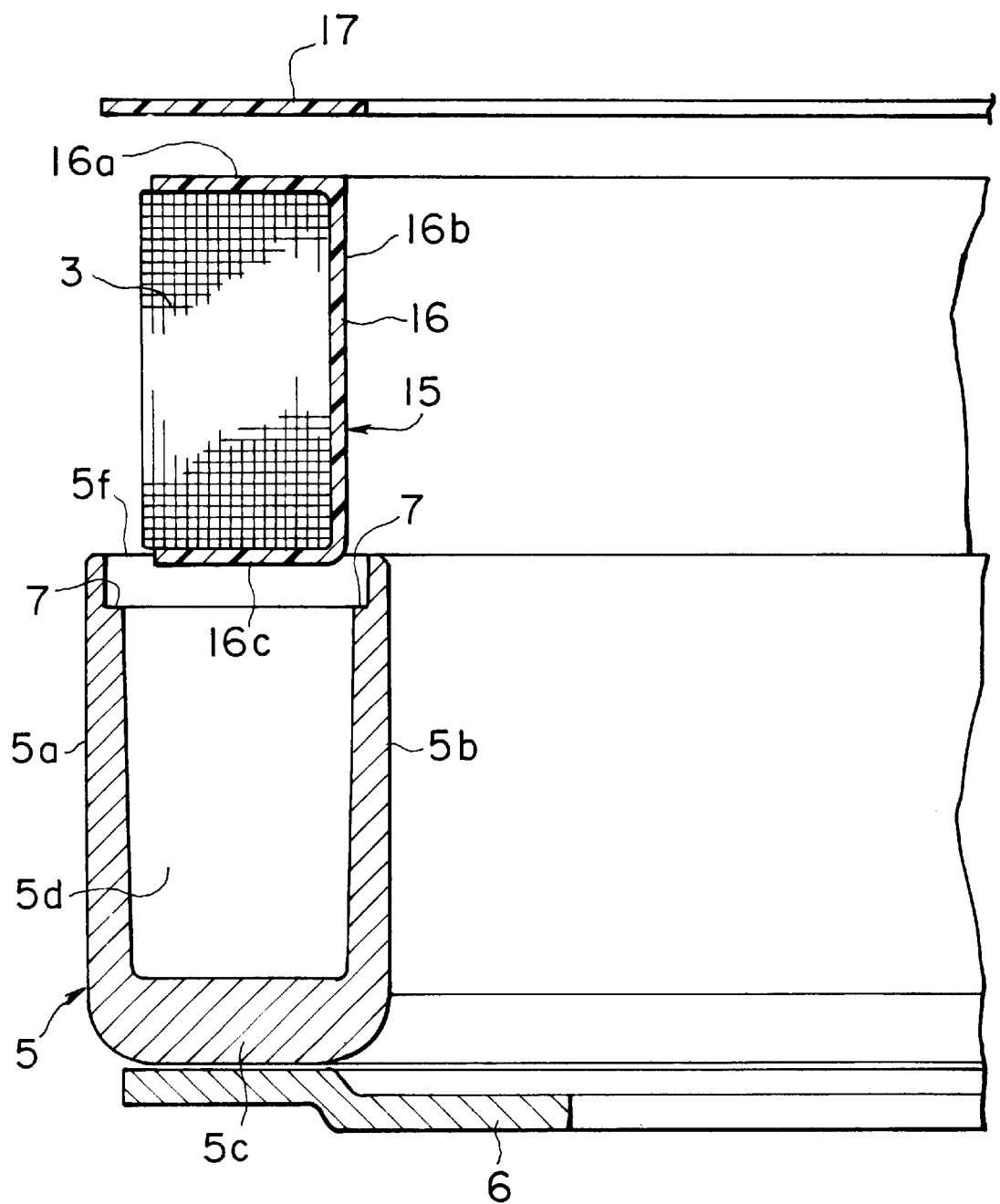
FIG. 10 is an exploded cross-sectional view of the electromagnet device depicted in FIG. 9, showing the assembly of the electromagnet device.

As depicted in FIG. 10, after coil member 15 is inserted into containing chamber 5d of ring member 5 through its opening portion 5f, elastic resin plate 17 is press fitted into containing chamber 5d through opening portion 5f. Resin plate 17 is pressed onto engaging portions 7. Then, a part of the radial inner edge portion of outer cylindrical portion 5a and a part of the radial outer edge portion of inner cylindrical portion 5b are crimped to form crimped portions 5e. Thus, seal mechanism 11 is completed. Coil element 3 may be enclosed by seal mechanism 11 using resin plate 17 in a completely sealed-off condition.

In this embodiment, seal mechanisms similar to seal mechanisms 11a–11c shown in FIGS. 3–5 may be employed by substituting the seal plates depicted in FIGS. 3–5 with resin plate 17.

Figure 11:
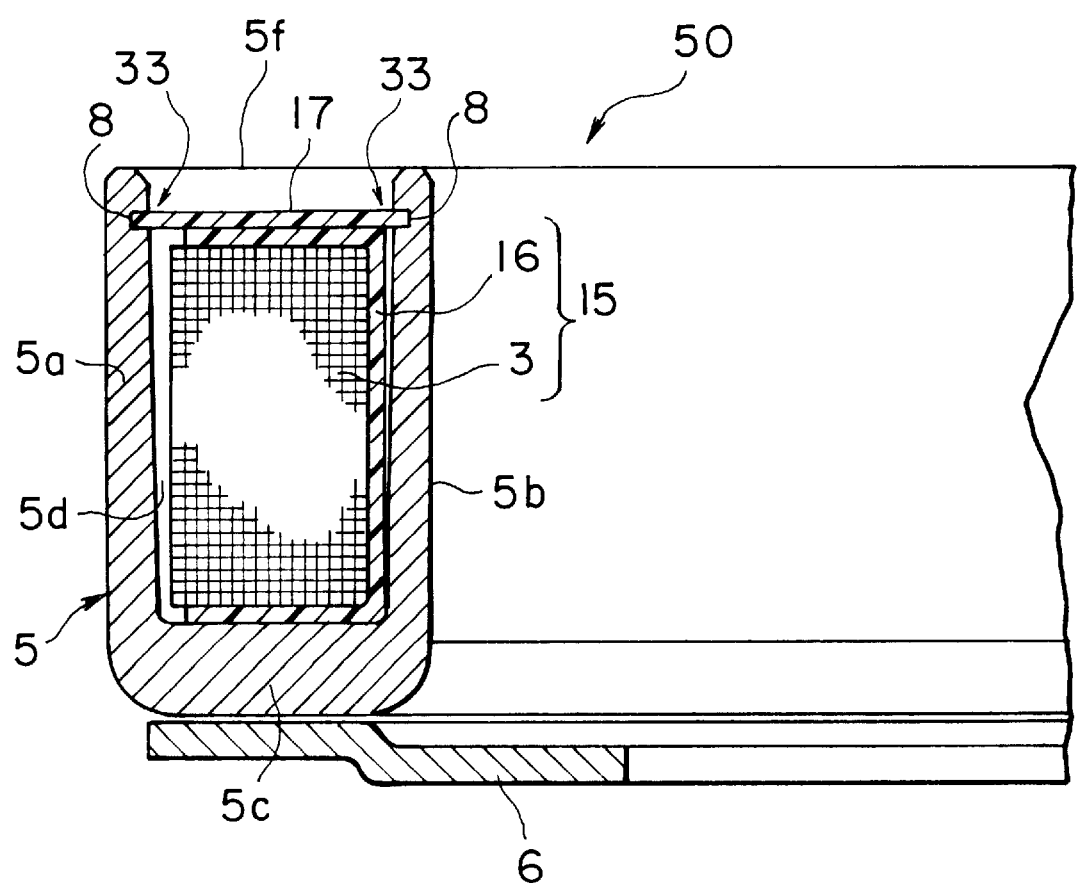
FIG. 11 is a partial, cross-sectional view of an electromagnet device of an electromagnetic clutch according to a fifth embodiment of the present invention.

FIG. 11 depicts an electromagnet device of an electromagnetic clutch according to a fifth embodiment of the present invention. In FIG. 11, electromagnet device 50 provided in an electromagnetic clutch includes a ring member 5, coil member 15, ring-like resin plate 17 provided as a seal plate separately from bobbin 16, and fastening member 6. Coil member 15 comprises bobbin 16, and coil element 3 provided in bobbin 16. Coil element 3 is contained within the U-shaped bobbin 16. In this embodiment, grooves 8 are defined on the radial inner surface of outer cylindrical portion 5a of ring member 5 and on the radial outer surface of inner cylindrical portion 5b of ring member 5. Resin plate 17 has a width slightly greater than the distance between the bottom portions of grooves 8 facing each other. The radial edge portions of resin plate 17 are press fitted into grooves 8. Thus, seal mechanism 33 is formed.

Figure 12:
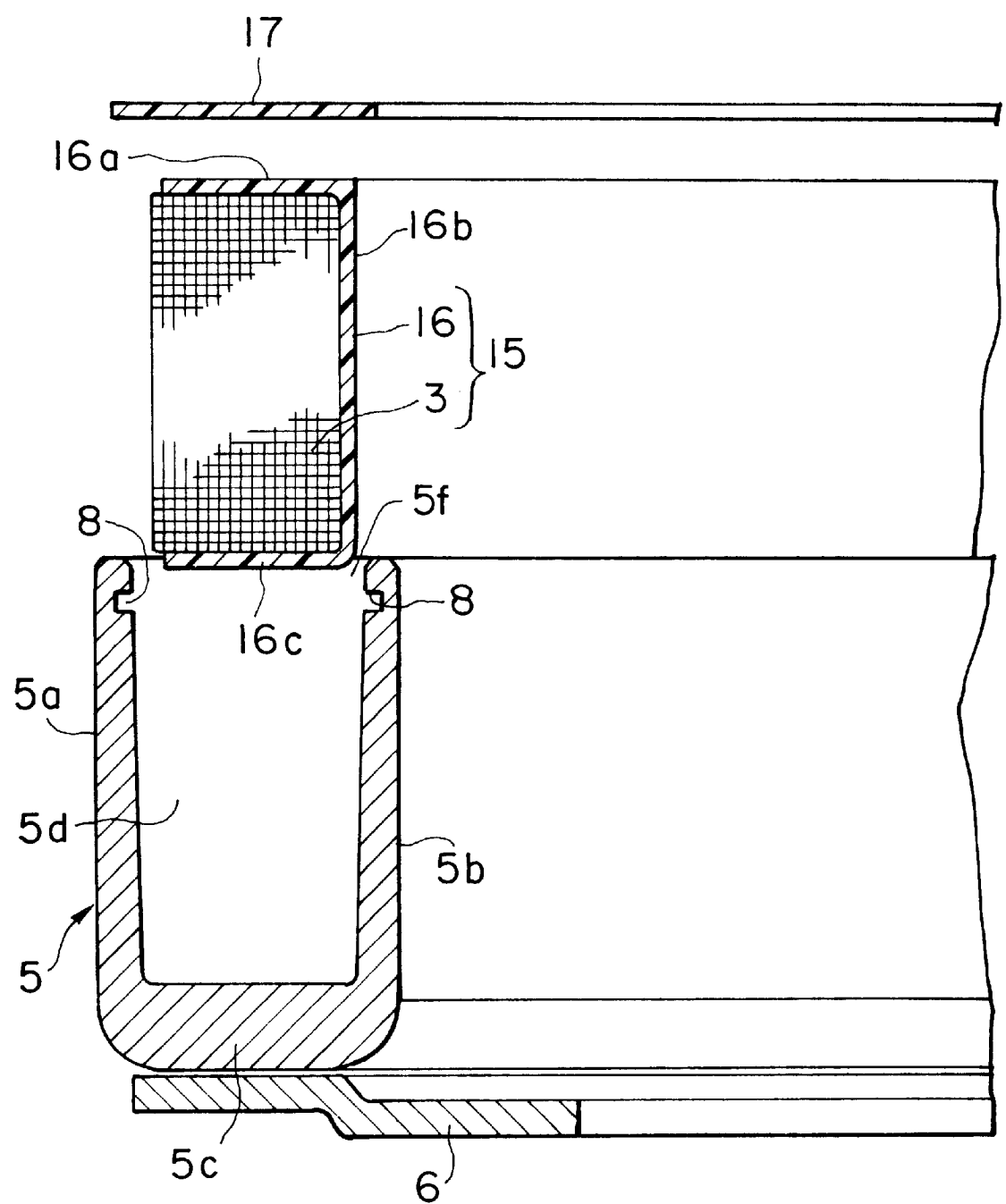
FIG. 12 is an exploded cross-sectional view of the electromagnet device depicted in FIG. 11, showing the assembly of the electromagnet device.

As depicted in FIG. 12, after coil member 15 is inserted into containing chamber 5d of ring member 5 through its opening portion 5f, resin plate 17 is press fitted into grooves 8 through opening portion 5f. When resin plate 17 is inserted into containing chamber 5d, cylindrical portions 5a and 5b may be elastically deformed, so that the width of opening portion 5f is temporarily enlarged, or resin plate 17 may be elastically deformed, so that the width of resin plate 17 is temporarily decreased. After the edges of resin plate 17 are press fitted into corresponding grooves 8, elastically deformed opening portion 5f, or elastically deformed resin plate 17, may recover its original shape. Thus, seal mechanism 33 is completed. Coil element 3 may be enclosed by seal mechanism 33 using resin plate 17 in a completely sealed-off condition.

In this embodiment, a seal mechanism similar to seal mechanisms 33a shown in FIG. 7 may be employed by substituting the seal plate depicted in FIGS. 7 for resin plate 17. Further, a jig (not shown) may be used for enlarging the width of opening portion 5f prior to inserting resin plate 17.

Figure 13:
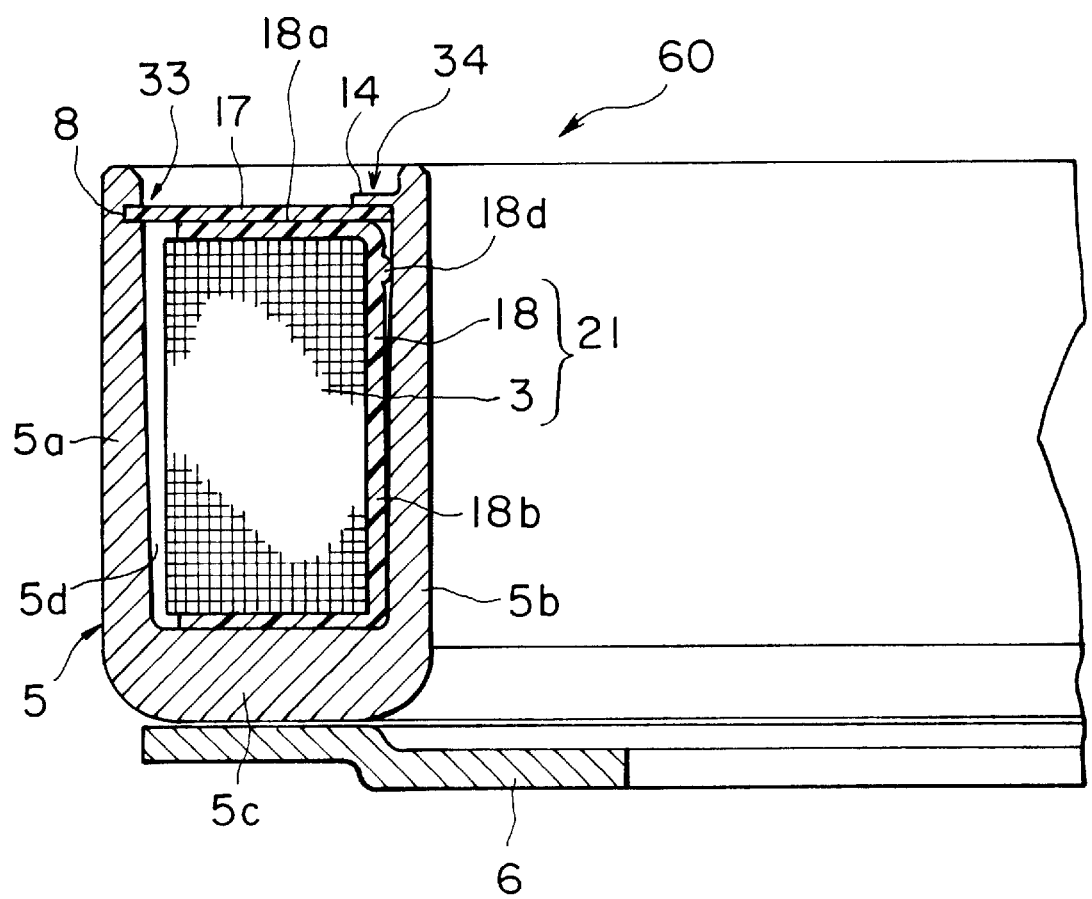
FIG. 13 is a partial, cross-sectional view of an electromagnet device of an electromagnetic clutch according to a sixth embodiment of the present invention.

FIG. 13 depicts an electromagnet device 60 of an electromagnetic clutch according to a sixth embodiment of the present invention. In FIG. 13, electromagnet device 60 provided in an electromagnetic clutch includes a ring member 5; coil member 21; ring-like resin plate 17, which is provided as a seal plate separately from bobbin 18; and fastening member 6. Coil member 21 comprises bobbin 18, and coil element 3 provided in bobbin 18. Coil element 3 is contained within the U-shaped bobbin 18. In this embodiment, groove 8 is defined on the radial inner surface of outer cylindrical portion 5a of ring member 5. The radially outer edge of resin plate 17 is fitted into groove 8. Thus, seal mechanism 33 is formed. Side plate portion 18a (a ceiling portion) of bobbin 18 radially extends shorter than coil element 3 in the radially outward direction. Protruded portion 18d is provided on the outer surface of connecting portion 18b of bobbin 18, similarly in the embodiment depicted in FIG. 8A. Protruded portion 18d is pressed onto the radially outer surface of inner cylindrical portion 5b of ring member 5. The inner edge of resin plate 17 is fixed by crimped portion 14. Thus, seal mechanism 34 is formed.

Figure 14:
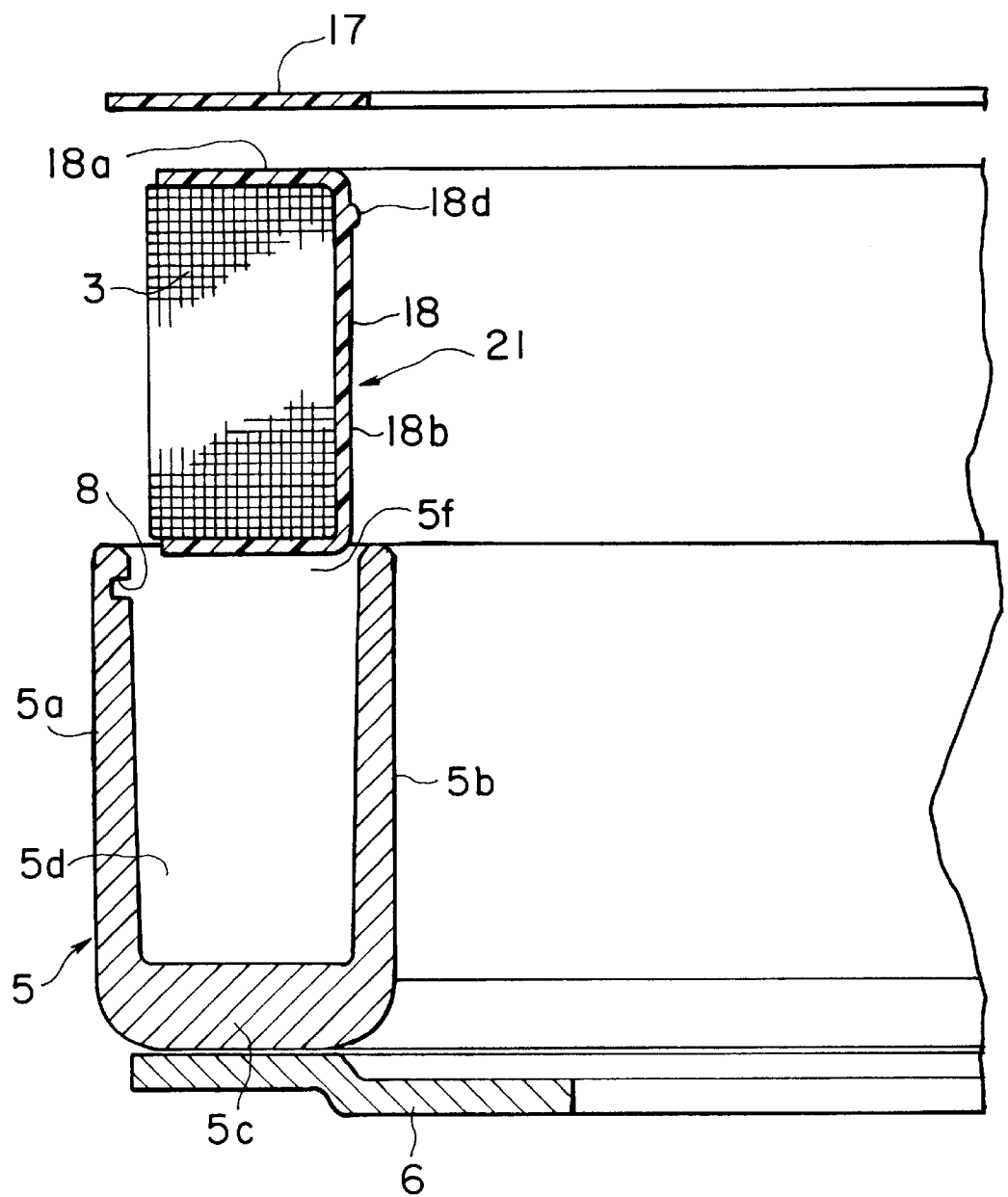
FIG. 14 is an exploded cross-sectional view of the electromagnet device depicted in FIG. 13, showing the assembly of the electromagnet device.

As depicted in FIG. 14, after coil member 21 is inserted into containing chamber 5d of ring member 5 through its opening portion 5f, resin plate 17 is inserted into containing chamber 5d. The outer edge of resin plate 17 is fitted into groove 8, and the inner edge of resin plate 17 is fixed by forming crimped portions 14. Seal mechanisms 33 and 34 enclose coil member 21 in containing chamber 5d of ring member 5. In particular, in seal mechanism 34, even if water enters through a gap between caulked portions 14, the entry of water may be interrupted by the engagement mechanism of protruded portion 18d pressed onto connecting portion 5b of ring member 5. Therefore, coil element 3 may be enclosed in a completely sealed-off condition.

Protruded portion 18d may have another cross-sectional shape, such as a shape depicted in FIG. 8B, 8C, or 8D.

Figure 15:
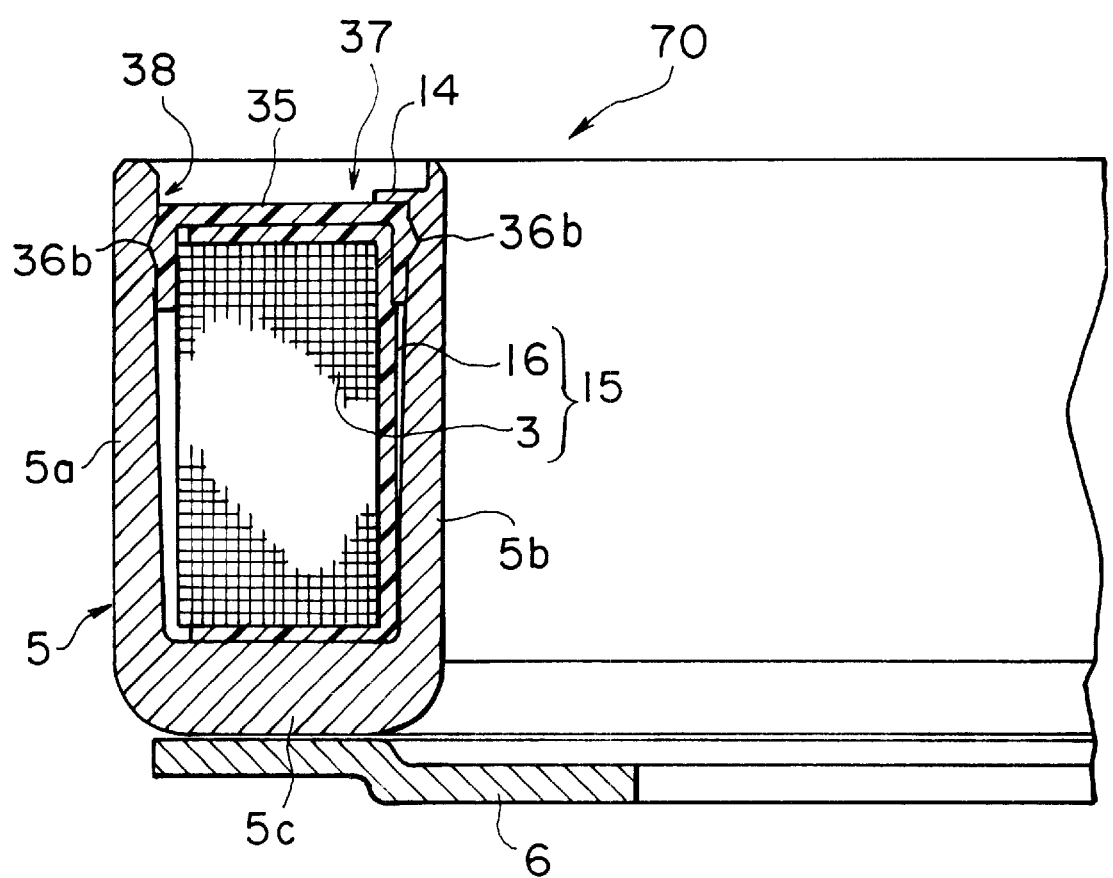
FIG. 15 is a partial, cross-sectional view of an electromagnet device of an electromagnetic clutch according to a seventh embodiment of the present invention.

FIG. 15 depicts an electromagnet device 70 of an electromagnetic clutch according to a seventh embodiment of the present invention. In FIG. 15, electromagnet device 70 provided in an electromagnetic clutch includes a ring member 5; coil member 15; elastic ring-like resin cover 35 (a resin plate), which is provided as a seal plate separately from bobbin 16; and fastening member 6. Coil member 15 comprises bobbin 16, and coil element 3 provided in bobbin 16. Coil element 3 is contained within the U-shaped bobbin 16. In this embodiment, groove 8 is not formed on the surfaces of cylindrical portions 5a and 5b of ring member 5. The surfaces of cylindrical portions 5a and 5b are tapered surfaces, so that the width of containing chamber 5d increases gradually towards its opening portion 5f. Side plate portion 16a (a ceiling portion) of bobbin 16 extends in the radially outward direction less than coil element 3. Resin cover 35 comprises upper plate portion 35a, radial outer side portion 35b, and radial inner side portion 35c. Protruded portion 36a extending over the entire circumference of ring cover is formed on the outer surface of radial outer side portion 35b. Protruded portion 36b extending over the entire circumference of ring cover is formed on the outer surface of radial inner side portion 35c. Resin cover 35 is press fitted into containing chamber 5d. The inner edge of resin cover 35 is fixed by crimped portion 14. Thus, seal mechanism 37 and seal mechanism 38 are formed.

Figure 16:
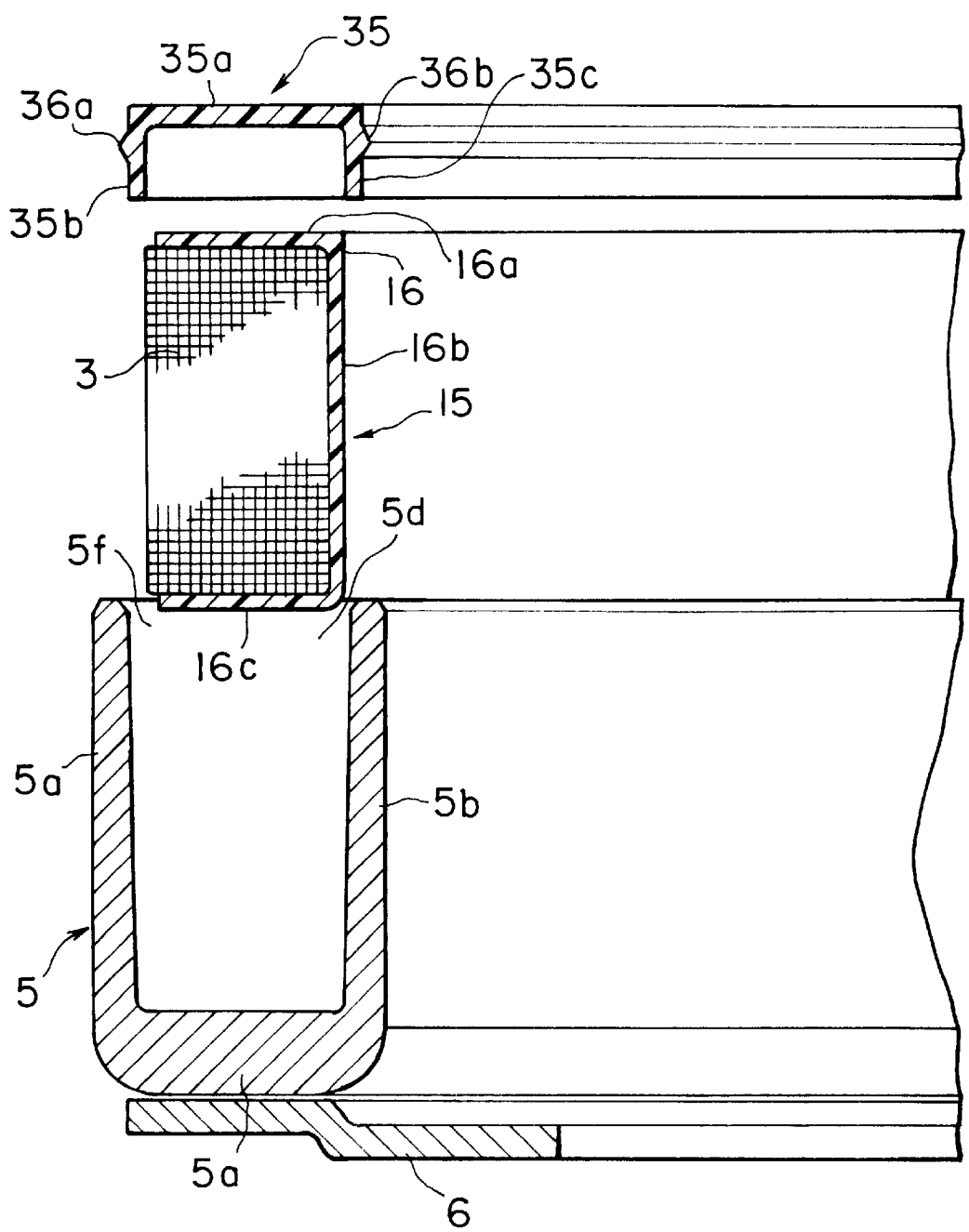
FIG. 16 is an exploded cross-sectional view of the electromagnet device depicted in FIG. 15, showing the assembly of the electromagnet device.

As depicted in FIG. 16, after coil member 15 is inserted into containing chamber 5d of ring member 5 through its opening portion 5f, elastic resin cover 35 is press fitted into containing chamber 5d. Resin cover 35 then is fixed by a plurality of crimped portions 14. Coil member 15 is sealed by the press fitting seal mechanisms between the radial inner surface of outer cylindrical portion 5a and protruded portion 36a and between the radial outer surface of inner cylindrical portion 5b and protruded portion 36b. In particular, even if water enters through a gap between crimped portions 14, the entry of water may be interrupted by pressed protruded portions 36a and 36b. Therefore, coil element 3 may be enclosed in a completely sealed-off condition.

In this embodiment, crimped portion 14 may be provided at the outer edge side of resin cover 35 to fix resin cover 35, or may be provided at both inner and outer edge side positions.

In the above-described embodiments, the number of crimped portions disposed circumferentially may be varied as appropriate to obtain the desired seal. Further, a crimped portion continuously extending over the entire circumference may be provided.

Although embodiments of the present invention have been described in detail herein, the scope of the invention is not limited thereto. It will be appreciated by those skilled in the art that various modifications may be made without departing from the scope of the invention. Accordingly, the embodiments disclosed herein are only exemplary. It is to be understood that the scope of the invention is not to be limited thereby, but is to be determined by the claims which follow.

What is claimed is:

1. An electromagnetic clutch including an electromagnetic device housed within a rotor, said electromagnetic device comprising:
    a ring member having a containing chamber;
    a coil member contained within said containing chamber of said ring member, said coil member comprising a bobbin and a coil element provided within said bobbin; and
    a seal mechanism provided for enclosing said coil element within said containing chamber of said ring member in a sealed-off condition, wherein said seal member comprises a seal plate engaging an engaging portion formed on an inner surface of said containing chamber of said ring member and said engaging portion comprises a first groove formed on said inner surface of said containing chamber of said ring member, said first groove extending circumferentially about said ring member.

2. The electromagnetic clutch of claim 1, wherein said seal plate comprises a side plate portion of said bobbin.

3. The electromagnetic clutch of claim 1, wherein said seal plate comprises a resin plate provided separately from said bobbin.

4. The electromagnetic clutch of claim 1, wherein said engaging portion comprises a stepped portion formed on said inner surface of said containing chamber of said ring member, said stepped portion extending circumferentially about said ring member.

5. The electromagnetic clutch of claim 1, wherein said seal plate has a projection extending circumferentially about said ring member, said projection engaging said engaging portion.

6. The electromagnetic clutch of claim 5, wherein said projection is fitted into a second groove formed on said engaging portion, said second groove extending circumferentially about said ring member.

7. The electromagnetic clutch of claim 1, wherein said seal plate has a V-shaped groove on its radial end surface.

8. The electromagnetic clutch of claim 1, wherein said seal plate has a notch on its edge portion.

9. The electromagnetic clutch of claim 1, wherein a part of said inner surface of said containing chamber of said ring member is crimped and said seal plate is fixed in said containing chamber of said ring member by said crimping.

10. The electromagnetic clutch of claim 1, wherein an inner surface of said containing chamber of said ring member positioned deeper than said engaging portion is formed as a tapered surface causing a width of said containing chamber to gradually decrease.

11. The electromagnetic clutch of claim 1, wherein said seal mechanism comprises a protruded portion placed into contact with an inner surface of said containing chamber of said ring member, said protruded portion extending circumferentially about said ring member.

12. The electromagnetic clutch of claim 1, wherein said electromagnetic clutch is used for a compressor.

* * * * *